Jan. 13, 1942.   J. F. FRANZEN   2,269,526
APPARATUS FOR CUTTING METAL
Filed Nov. 3, 1939   2 Sheets-Sheet 1

INVENTOR
James F. Franzen
BY
ATTORNEY

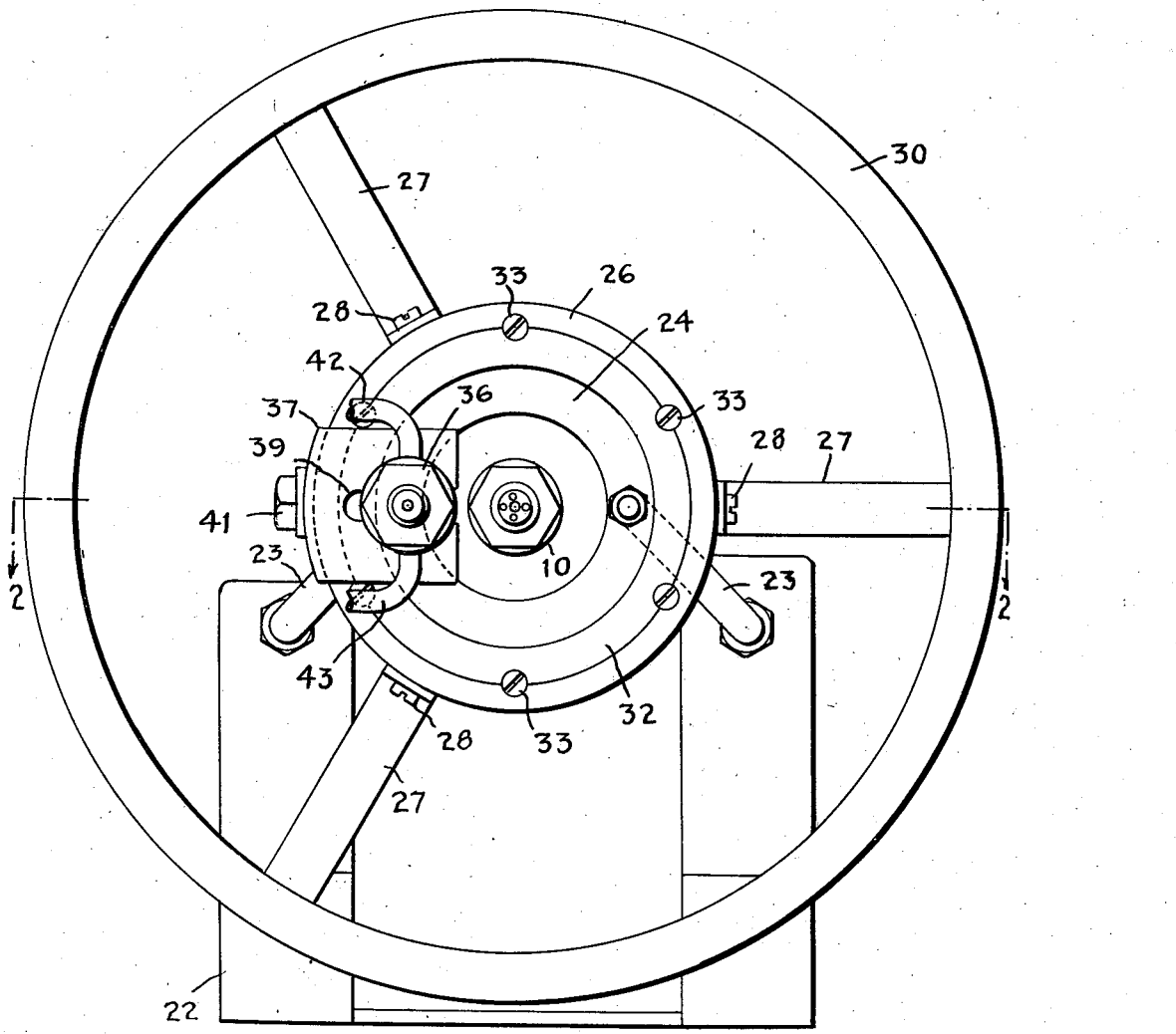

Patented Jan. 13, 1942

2,269,526

UNITED STATES PATENT OFFICE 2,269,526

APPARATUS FOR CUTTING METAL

James F. Franzen, Chicago, Ill., assignor to Air Reduction Company, Incorporated, New York, N. Y., a corporation of New York Application November 3, 1939, Serial No. 302,700

5 Claims. (Cl. 266—23)

This invention relates to the cutting of openings in metal pieces, such as steel plates or structural sections. It is an object of the invention to provide improved apparatus for cutting metal bodies without leaving a hard edge along the cut. In the case of some air hardening steels, such as structural silicon steel, gas cutting that leaves the edge hardened may be unacceptable because of the danger of surface checks forming in the steel after cutting.

With this invention a heating torch is used simultaneously with the cutting torch to either prevent the cut steel from hardening or to anneal the metal progressively close behind the region of cutting. The reduced cooling rate can be obtained with the heating torch either ahead of or behind the cutting jet; the annealing is obtained when the heating torch is some distance behind the cutting jet.

In accordance with one feature of this invention the heating torch is moved across the workpiece simultaneously with a cutting jet that is guided along a non-rectilinear course, and the heating torch is steered independently of the cutting jet to maintain the desired relationship between the heating and cutting jets regardless of changes in the direction of translation of the cutting jet. The heating jet is kept at a constant spacing from the cutting jet by moving the heating jet about an axis that passes through the region of attack of the cutting jet on the work-piece.

Another object of the invention is to provide a cutting torch and heating torch with a common support, so that they can be propelled by the same tracer, and to make the heating torch movable with respect to the cutting torch and independently steerable.

Other features relate to the construction of an attachment for connection to the frame of a universal cutting machine, and to steering and adjusting means for a heating torch carried by that attachment.

Other objects, features, and advantages of the invention will appear or be pointed out as the specification proceeds.

In the accompanying drawings, forming part hereof:

Fig. 3 is a bottom plan view of the apparatus shown in Fig. 2.

Figure 1:
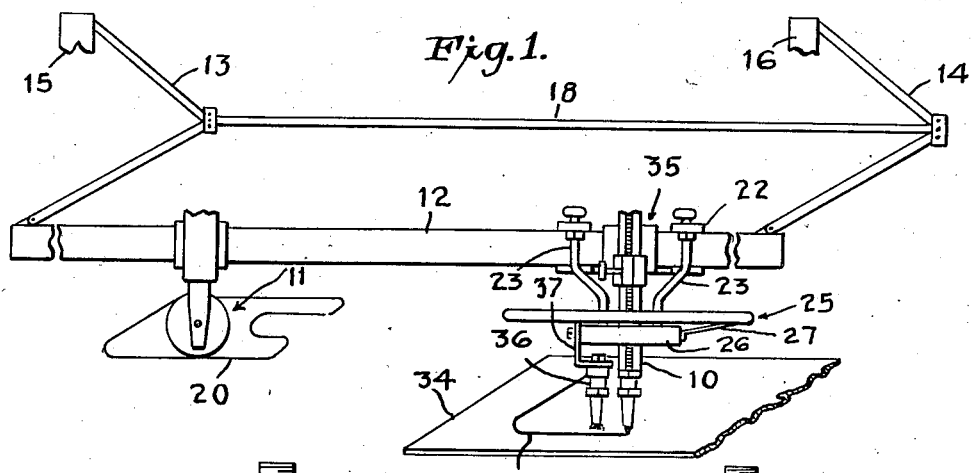
Fig. 1 is a diagrammatic view, partly in perspective, showing apparatus for cutting metal plates in accordance with this invention.

A cutting torch 10 and tracer 11 are connected at spaced regions to a front bar 12 of a folding parallelogram frame. The front bar 12 is supported by jointed arms 13 and 14 that swing from columns 15 and 16. These jointed arms 13, 14 are connected together in the region of their joints by a cross link 18 that completes the folding parallelogram linkage.

The tracer 11 is shown diagrammatically since manually guided tracers with a steerable traction wheel are well known in the art. Such a tracer is described in detail in Patent No. 1,999,853, dated April 30, 1935.

The front bar 12 always moves parallel to itself and any movement of the tracer 11 causes a corresponding movement of the torch 10. The tracer 11 can be steered to travel in any and changing directions along an outline or pattern of the shape to be cut. An outline 20 with one reentrant and three straight sides and connecting corner arcs of substantial radius is shown in Fig. 1, but it will be understood that this outline is merely representative of non-rectilinear patterns or outlines. The folding parallelogram support is representative of universal cutting machines by which a torch can be moved along a non-rectilinear course in accordance with a drawing or pattern. A template-follower can be used in place of the manually guided tracer 11 to move the bar 12 and torch 10. The term "tracer" is used in the description and claims in a generic sense to include template-followers.

Figure 2:
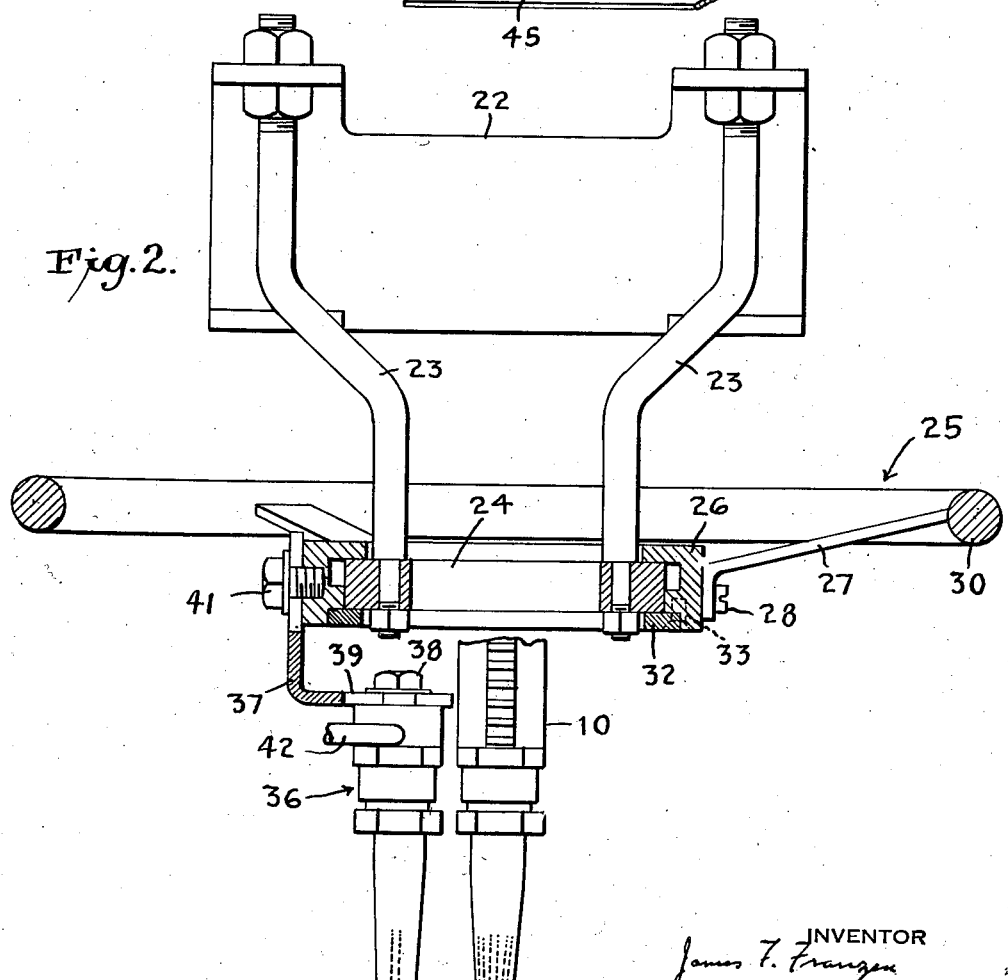
Fig. 2 is an enlarged, vertical sectional view of the flame softening apparatus shown in Fig. 1, the section being taken on the line 2—2 of Fig. 3.

A bracket 22 clamped on the front bar 12 has two supports 23 extending down to an annular frame 24, best shown in Fig. 2. A wheel 25 has a hub 26 that rests on the annular frame 24 as a bearing and has spokes 27 connected to the hub 26 by screws 28. At their outer ends the spokes 27 connect with a rim 30 of the wheel.

A ring 32 is attached to the lower side of the hub 26 by screws 33 and extends under the annular frame 24 to prevent upward displacement of the wheel 25 after it has been assembled with the frame 24. The hub 26 is a running fit on the frame 24 so that the wheel will turn freely. The wheel 25 can be connected with the bar 12 without the bracket 22 by having the supporting bearing for the wheel on the torch-holder of the torch 10, or even on the torch itself.

The bracket 22 and supports 23 are designed and positioned to make the axis of rotation of the wheel 25 pass through a point on the workpiece 34 in the region at which the cutting jet of the torch 10 attacks the work-piece. With a straight torch such as the torch 10, the axis of the annular frame and the axis of rotation of the wheel 25 are coincident with the axis of the torch 10, of its cutting jet, and of the torch-holder 35 that connects the torch 10 to the frame of the universal cutting machine, the bar 12 in Fig. 1.

An oxy-fuel gas heating torch 36 of special short design is attached to a bracket 37 by a screw 38 that extends through a slot 39 in the bracket 37. The slot 39 preferably extends radially with respect to the axis of rotation of the wheel 25 but may extend at any acute angle to a radius of the wheel. The torch 36 can be moved closer to or further from the cutting torch 10 by shifting the heating torch 36 lengthwise of the slot 39. Even if the slot is at an acute angle to a radius of the wheel, movement of the torch 39 along the slot has a radial component.

The bracket 37 has an upwardly extending portion connected to the hub 26 by a screw 41. This screw 41 extends through a slot in the upwardly extending portion of the bracket to permit vertical adjustment of the bracket and heating torch. Oxygen and fuel gas, preferably acetylene, are supplied to the heating torch 36 through the tubing connections 42 and 43, respectively.

In the operation of the invention, the tracer 11 moves along the irregular outline 20 of the pattern or drawing and causes the cutting torch 10 to follow a similar course across the work-piece 34. The cut in the work-piece is indicated by the reference character 45. The heating torch 36 can be shifted to any side of the cutting torch 10 by turning the hand wheel 25.

In the drawings the heating torch 36 is shown following the cutting torch and directing the heating flame against the metal approximately one-half inch from the cut edge and on the part of the plate that is to be used. When the cutting tip 10 travels around a curve, the wheel 25 is turned to steer the heating torch and keep it always in the same relation to the cut edge.

The preferred embodiment of the invention has been described, but changes and modifications can be made and some features of the invention can be used without others.

I claim:

1. A cutting machine including a support that has universal movement in a plane, tracer means for moving said support in accordance with the outline of a pattern, a cutting torch holder connected in a fixed position on the support, a wheel connected with the support and rotatable independently of the cutting torch about an axis, and a heating torch holder carried by the wheel and movable upon rotation of the wheel into position to locate the heating torch behind the cutting jet and to one side of the path followed by the cutting jet.

2. A universal cutting machine including a folding parallelogram frame with a front bar that has universal movement in a plane, a tracer connected to the front bar, a cutting torch connected to the front bar at a distance from the tracer in position to project a cutting jet against a work-piece, a bracket attached to the front bar in the region of the cutting torch, an annular frame surrounding the cutting torch and supported by the bracket with the axis of the annular frame substantially coincident with the axis of the cutting jet, a wheel with a hub rotatable on the annular frame as a bearing, a torch-holder carried by the wheel and adjustable radially and vertically on said wheel to regulate its spacing from the cutting torch and the work, and a heating torch in the torch-holder carried by the wheel.

3. An attachment for a universal cutting machine including a bracket for connecting the attachment to the machine, an annular support carried by the bracket, the opening through said support being substantially larger than a cutting torch so that the support can be connected to the machine in a position surrounding a cutting torch, a wheel with a hub that turns on the annular frame as a bearing, and a heating torch holder connected to the wheel at a distance from the center of the wheel.

4. Gas cutting apparatus comprising two torch-holders connected with a common support, the connecting means of one of said torch-holders including a wheel by which that torch holder is carried, said wheel being rotatable about the axis of the other torch-holder, and means for adjusting the torch-holder that is carried by the wheel toward and from the axis of the wheel to regulate the spacing of the torch-holders from one another.

5. An attachment for a universal cutting machine including a support and connecting means for securing the support to the machine, said support having an opening for a cutting torch so that the support can be connected to the machine in a position surrounding a cutting torch of the machine, and a torch-holder with bearing means on which it is rotatable on said support around said opening.

JAMES F. FRANZEN.

DISCLAIMER 2,269,526.—*James F. Franzen*, Chicago, Ill. APPARATUS FOR CUTTING METAL. Patent dated January 13, 1942. Disclaimer filed July 31, 1943, by the assignee, *Air Reduction Company, Incorporated.*

Hereby enters this disclaimer to claims 3, 4, and 5 in said specification.

[*Official Gazette August 24, 1943.*]